United States Patent
Ohashi et al.

[11] Patent Number: 5,953,095
[45] Date of Patent: Sep. 14, 1999

[54] LIQUID CRYSTAL CELL AND METHOD OF MANUFACTURING THE SAME

[75] Inventors: Nobuhiko Ohashi, Kariya; Takeshi Kohama, Okazaki, both of Japan

[73] Assignee: Denso Corporation, Kariya, Japan

[21] Appl. No.: 09/049,182

[22] Filed: Mar. 27, 1998

[30] Foreign Application Priority Data

Mar. 28, 1997 [JP] Japan .................................... 9-077330

[51] Int. Cl.⁶ .............................................. G02F 1/1341
[52] U.S. Cl. ............................................... 349/189
[58] Field of Search ............................................. 349/189

[56] References Cited

U.S. PATENT DOCUMENTS 5,355,236 10/1994 Mitsui .
5,548,428 8/1996 Masaki et al. .
5,699,138 12/1997 Watanabe et al. ...................... 349/189

FOREIGN PATENT DOCUMENTS 63-004216 1/1988 Japan .
5-034696 2/1993 Japan .
8-220550 8/1996 Japan .

*Primary Examiner*—William L. Sikes
*Assistant Examiner*—James A. Dudek
*Attorney, Agent, or Firm*—Pillsbury Madison & Sutro LLP

[57] ABSTRACT

When a liquid crystal cell is filled with smectic liquid crystal, first, smectic liquid crystal having an isotropic phase is supplied into the liquid crystal cell under a first pressure. Then, smectic liquid crystal having a smectic phase is further supplied into the liquid crystal cell under a second pressure higher than the first pressure. Accordingly, even if smectic liquid crystal having the isotropic phase and held in the liquid crystal cell is changed into the smectic phase to cause volumetric shrinkage thereof, an amount of smectic liquid crystal reduced by the volumetric shrinkage can be compensated by supplying smectic liquid crystal into the liquid crystal cell under the second pressure. As a result, the liquid crystal cell can be securely prevented from having vacancies therein.

12 Claims, 3 Drawing Sheets

LIQUID CRYSTAL CELL AND METHOD OF MANUFACTURING THE SAME

CROSS REFERENCE TO RELATED APPLICATION

This application is based upon and claims the benefit of priority of the prior Japanese Patent Application No. 9-77330 filed on Mar. 28, 1997, the contents of which are incorporated herein by reference.

BACKGROUND OF THE INVENTION

1. Field of the Invention

The present invention relates to a liquid crystal cell filled with smectic liquid crystal such as ferroelectric or antiferroelectric liquid crystal for displaying images thereon, and to a method of manufacturing the liquid crystal cell.

2. Related Arts

Conventionally, to fill a liquid crystal cell with smectic liquid crystal, the liquid crystal cell is disposed in a vacuum chamber and smectic liquid crystal is put on a vicinity of a liquid crystal suction port of the liquid crystal cell. Then, the vacuum chamber is evacuated while heated, so that the inside of the liquid crystal cell becomes a vacuum state. Accordingly, smectic liquid crystal changes to be an isotropic phase and expands around the liquid crystal suction port. Thereafter, the pressure in the vacuum chamber is released to an atmospheric pressure so that a difference in pressure between outside and inside of the liquid crystal cell is produced. Due to the difference in pressure, smectic liquid crystal is sucked into the liquid crystal cell through the liquid crystal suction port. Then, the temperature of the liquid crystal cell filled with smectic liquid crystal is returned to a room temperature.

At the room temperature, however, the phase of smectic liquid crystal changes from the isotropic phase to a smectic phase (for example, smectic A phase). This transition is accompanied by volumetric shrinkage of smectic liquid crystal (see FIG. 5). Consequently, vacancies in which smectic liquid crystal does not exist are produced within the liquid crystal cell, resulting in deterioration of display performance such as display irregularity.

To solve the problem, JP-A-6-51258 proposes a method of compulsorily supplying smectic liquid crystal into a liquid crystal cell filled with smectic liquid crystal under pressure. In this method, however, the liquid crystal cell is heated so that smectic liquid crystal therein has the isotropic phase to produce a constant pressure therein. In this state, smectic liquid crystal is supplied into the liquid crystal cell. Thereafter, the temperature of the liquid crystal cell is lowered to the room temperature, and the pressure applied to the liquid crystal cell is decreased to the atmospheric pressure.

By lowering the temperature to the room temperature the phase of smectic liquid crystal changes from the isotropic phase to the smectic phase again, resulting in volumetric shrinkage. At that time, smectic liquid crystal is not supplied into the liquid crystal cell, because the pressure around the liquid crystal cell is decreased to the atmospheric pressure. Consequently, the liquid crystal cell cannot be completely prevented from having vacancies therein.

SUMMARY OF THE INVENTION

The present invention has been made in view of the above-mentioned problem and an object of the present invention is to provide a liquid crystal cell filled with smectic liquid crystal without vacancies. Another object of the present invention is to provide a method of manufacturing the liquid crystal cell filled with smectic liquid crystal without vacancies.

According to the present invention, when a liquid crystal cell is filled with smectic liquid crystal, first, smectic liquid crystal having an isotropic phase is supplied into the liquid crystal cell under a first pressure. Then, smectic liquid crystal having a smectic phase is further supplied into the liquid crystal cell under a second pressure higher than the first pressure. Accordingly, even if smectic liquid crystal having the isotropic phase and held in the liquid crystal cell is changed into the smectic phase to cause volumetric shrinkage thereof, an amount of smectic liquid crystal reduced by the volumetric shrinkage can be compensated by supplying smectic liquid crystal having the smectic phase under the second pressure. As a result, the liquid crystal cell can be securely prevented from having vacancies therein.

BRIEF DESCRIPTION OF THE DRAWINGS

These and other objects and features of the present invention will become more readily apparent from a better understanding of a preferred embodiment described below with reference to the following drawings.

DETAILED DESCRIPTION OF THE PREFERRED EMBODIMENT

Figure 1:
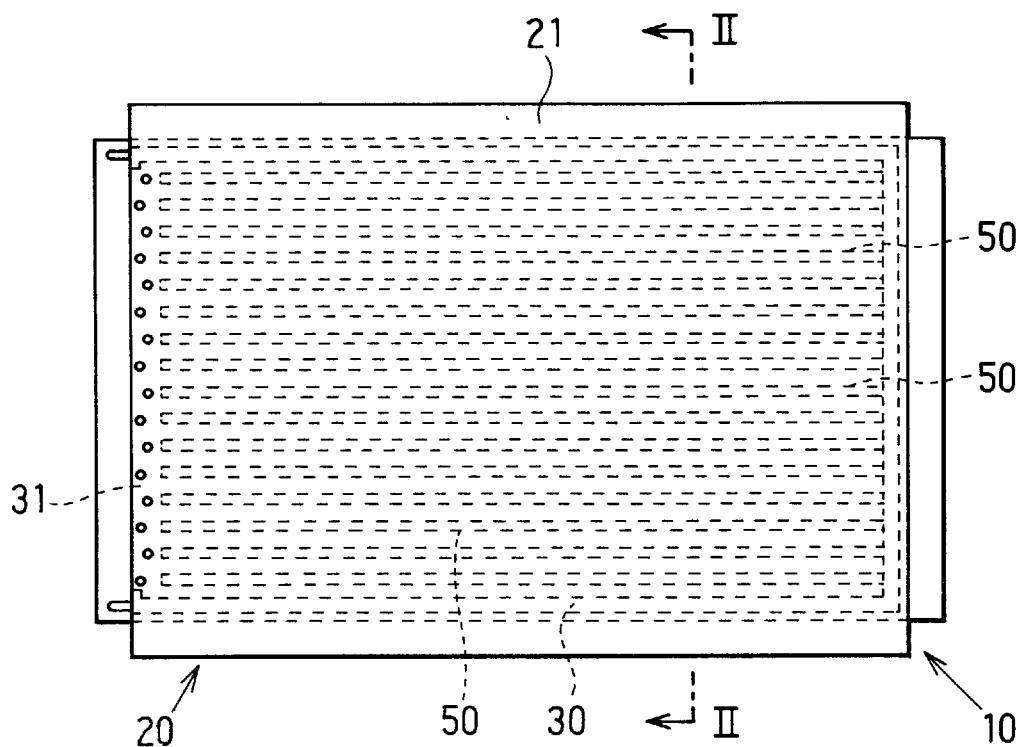
FIG. 1 is a plan view showing a liquid crystal cell in a preferred embodiment according to the present invention.
Figure 2:
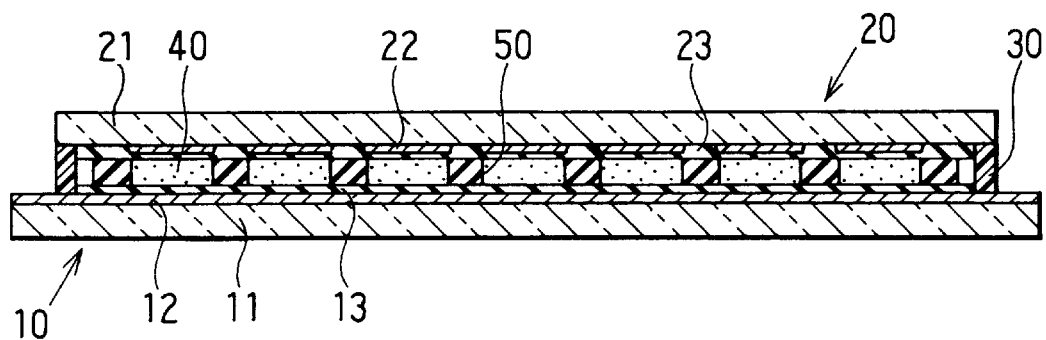
FIG. 2 is a cross-sectional view taken along II—II line in FIG. 1.

Referring to FIGS. 1 and 2, a liquid crystal cell in a preferred embodiment of the present invention has a lower electrode substrate 10, an upper electrode substrate 20, and a generally ring-shaped seal member 30 disposed between peripheral portions of the electrode substrates 10, 20. Smectic liquid crystal is retained inside the seal member 30 between the electrode substrates 10, 20.

The lower electrode substrate 10 is composed of a transparent substrate 11, several strips of transparent electrodes 12 formed on an inner surface of the substrate 11, and an orientation layer 13 formed on the substrate 11 through the electrodes 12. Likewise, the upper electrode substrate 20 is composed of a transparent substrate 21, several strips of transparent electrodes 22 formed on an inner surface of the substrate 21, and an orientation layer 23 formed on the substrate 21 through the electrodes 22. On the orientation layer 23 of the electrode substrate 20, partition walls 50 are provided at portions between adjacent transparent electrodes 22. The upper and lower electrode substrates 10, 20 are overlapped on each other to sandwich the partition walls 50 therebetween and to provide matrix-type pixels between the transparent electrodes 12, 22. Thus constituted liquid crystal cell has a display area which has a generally rectangular shape with a diagonal of 6 inches.

Figure 3:
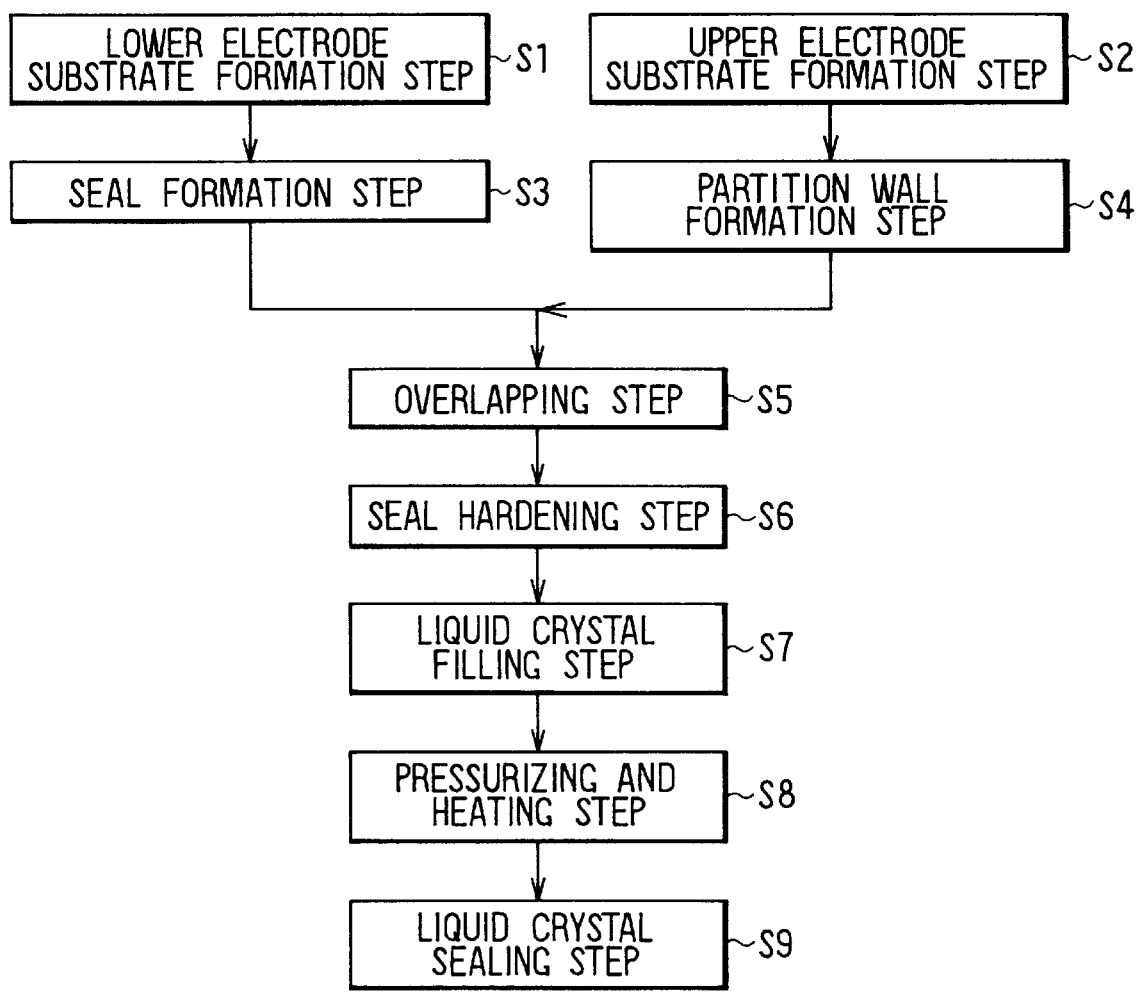
FIG. 3 is a flow chart showing steps for manufacturing the liquid crystal cell of FIG. 1.

Next, a method of manufacturing the liquid crystal cell will be explained with reference to FIGS. 3 to 5. As indicated in FIG. 3, in steps S1 and S2, the lower and upper electrode substrates 10, 20 are formed respectively. In step S3, the seal member 30 is formed on the peripheral portion of the inner surface of the lower electrode substrate 10 to have a liquid crystal suction port 31 as shown in FIG. 1. In step S4, several strips of the partition walls 50 are formed on the orientation layer 23 of the upper electrode substrate 20 from photo-resist to respectively have a rectangular shape in cross-section. The partition walls 50 serve as adhesive spacers.

Then, in step S5, the electrode substrates 10, 20 are overlapped on each other through the seal member 30 and the partition walls 50. In step S6, the electrode substrates 10, 20 are heated while pressurized, so that the seal member 30 is hardened. At the same time, a gap (herebelow referred to as cell gap) between the electrode substrates 10, 20 is controlled to be a specific dimension, specifically be in a range of 1 $\mu$m to 2 $\mu$m. Thus, a vacant cell without holding liquid crystal therein is obtained.

Next, in step S7, smectic liquid crystal 40 is coated on the inner surface of the lower electrode substrate 10 in the vicinity of the liquid crystal suction port 31. After coating smectic liquid crystal 40, the vacant cell is placed within a vacuum chamber. The vacuum chamber is heated up to approximately 120° C. while evacuated. As the pressure in the vacuum chamber decreases and the temperature rises, smectic liquid crystal 40 is softened to be an isotropic liquid.

Here, it should be noted that the phase of smectic liquid crystal 40 changes in the following way;
(−20° C.) (71° C.) (75° C.) (95° C.)

crystal phase→SmCA*→SmC*→SmA→isotropic phase wherein SmCA* represents a chiral smectic CA phase, SmC* represents a chiral smectic C phase, and SmA represents a smectic A phase. Being in the isotropic phase means being in an isotropic liquid state for smectic liquid crystal 40.

Then, the pressure in the vacuum chamber is released to an atmospheric pressure to thereby cause a difference in pressure between inside and outside of the vacant cell. The softened smectic liquid crystal 40 is sucked into the cell through the liquid crystal suction port 31 due to the difference in pressure. After keeping the vacuum chamber at its state for predetermined time, the temperature of the vacuum chamber is returned to the room temperature. As a result, the liquid crystal cell filled with smectic liquid crystal 40 is obtained. Smectic liquid crystal 40 in the liquid crystal cell has the smectic A phase that is transformed from the isotropic phase with volumetric shrinkage (see FIG. 5). In the cell gap of the liquid crystal cell, vacancies are produced due to the volumetric shrinkage.

Then, step S8 is performed to eliminate the vacancies from the liquid crystal cell. In step S8, smectic liquid crystal 40, which is not sucked into the liquid crystal cell in step S7 to remain on the electrode substrate 10 around the liquid crystal suction port 31, is utilized. That is, after conducting step S7, the liquid crystal cell is put in a pressurizing and heating chamber. At that time, temperature and pressure around the liquid crystal cell are the room temperature and the atmospheric pressure, respectively. Profiles X, Y of temperature and pressure around the liquid crystal cell in the chamber in step S8 are indicated in FIG. 4, wherein the initial states of the temperature and pressure, i.e., the room temperature and the atmospheric pressure are indicated with X0 and Y0.

Then, the inside of the chamber is heated to have temperature T1 (=115° C.) as the profile X from X0 to X1. Simultaneously, nitrogen gas is introduced into the chamber to increase the pressure to be pressure P1 (=3 Kg/cm²) as the profile Y from Y1 to Y2. This state is kept for 2 hours. In this state, smectic liquid crystal 4 in the liquid crystal cell has the isotropic phase, and part of smectic liquid crystal 40 remaining on the electrode substrate 10 around the liquid crystal suction port 30 is additionally supplied into the liquid crystal cell.

Thereafter, the temperature in the chamber is lowered to temperature T2 (=80° C.) at a rate of 0.3° C. a minute as the profile X from X2 to X3. In this process, when the temperature becomes 95° C. that is slightly higher than phase transition temperature Tc (=91° C.), at which the phase of smectic liquid crystal 40 changes from the isotropic phase to the smectic A phase, pressurization to the inside of the chamber is started at a rate of 0.6 kg/cm² a minute. This point is indicated with Y3 on the profile Y. The pressure in the chamber is increased to be 5 kg/cm² as the profile Y from Y3 to Y4. The state of 80° C. and 5 kg/cm² is kept for 7 hours as the profile X from X3 to X4 and the corresponding profile Y. Then, while keeping the pressure of 5 kg/cm², the temperature is gradually decreased to the room temperature at a rate of 0.25° C. a minute as the profile X from X4 to X5. After keeping the room temperature for 1 hour, the chamber is released to have the atmospheric pressure, whereby the pressurizing and heating processes (step S8) are finished. Finally, the liquid crystal cell is hermetically sealed in step S9.

After performing step S8, the liquid crystal cell was examined if it had vacancies not filled with liquid crystal therein. As a result, it was confirmed that there was no vacancy in the liquid crystal cell. The reason is considered in the following way.

During the process corresponding to the profile X from X1 to X2, smectic liquid crystal 40 remaining on the lower electrode substrate 10 around the liquid crystal suction port 31, which has the isotropic phase, is preliminary sucked into the liquid crystal cell under the pressure of 3 kg/cm².

Then, during the process corresponding to the profile X from X2 to X3, the phase of smectic liquid crystal 40 changes from the isotropic phase to the smectic A phase to cause volumetric shrinkage of smectic liquid crystal 40. On the other hand, the pressure around the liquid crystal cell is increased when the temperature becomes 95° C. as the profile Y from Y3 to Y4. That is, when the volumetric shrinkage of smectic liquid crystal 40 occurs, the pressure around the liquid crystal cell is increased to be larger than the pressure (3 kg/cm²) when smectic liquid crystal 40 is kept in the isotropic phase. The pressure is increased finally to be 5 kg/cm². This results in the difference in pressure between outside and inside of the liquid crystal cell. Due to the difference in pressure, the remaining smectic liquid crystal 40 on the electrode substrate 10 around the liquid crystal suction port 31 is sucked into the liquid crystal cell to fill the vacancies that is produced by the volumetric shrinkage of liquid crystal 40 in the liquid crystal cell. As a result, the vacancies in the liquid crystal cell disappear. Here, it should be noted that smectic liquid crystal 40 is previously disposed in the vicinity of the liquid crystal suction port 31 with an amount sufficient for being supplied into the liquid crystal cell to fill the vacancies in step S8.

In this embodiment, because the electrode substrates 10, 20 are securely fixed to each other through the adhesive partition walls 50, the cell gap between the electrode substrates 10, 20 is hardly expanded by smectic liquid crystal 40 filling the cell gap. In addition, by performing step S8 as mentioned above, the cell gap between the electrode substrates 10, 20 can be filled with smectic liquid crystal 40 without remaining any vacancies therein.

Even in a case where the display area of the liquid crystal cell is large, the cell gap between the electrode substrates 10, 20 can be filled with smectic liquid crystal 40 without remaining any vacancies therein as well. To confirm this point, the inventors manufactured a large type liquid crystal cell having a diagonal of 17 inches in substantially the same steps as mentioned above. The large type liquid crystal cell has the same structure as that of the liquid crystal cell in this embodiment except the size of the display area. When manufacturing the large type liquid crystal cell, in step S8, only the times for keeping the temperature in the chamber at T1 from X1 to X2 and at T2 from X3 to X4 were lengthened to 5 hours and 10 hours respectively. Even in this case, the large type liquid crystal cell did not have any vacancies in the cell gap thereof. Accordingly, it is confirmed that the liquid crystal cell can be filled with smectic liquid crystal without any vacancies regardless of the size of the display area thereof.

The present invention can be applied to other liquid crystal cells adopting an electrode substrate with a color filter member, spherical spacers and adhesive particles in place of the partition walls 50, and the like. In these cases, the same effects can be obtained.

In this embodiment, step S8 for removing the vacancies from the liquid crystal cell is performed after step S7 for filling the liquid crystal cell with smectic liquid crystal 40. However, both steps S7, S8 may be combined together. That is, in this embodiment, in step S7, smectic liquid crystal 40 is sucked into the liquid crystal cell due to the difference in pressure between inside and outside of the liquid crystal cell when the pressure outside of the liquid crystal cell is the atmospheric pressure. Instead, it may be performed when the pressure outside the liquid crystal cell is higher than the atmospheric pressure, for example, when it is 3 kg/cm$^2$.

Figure 4:
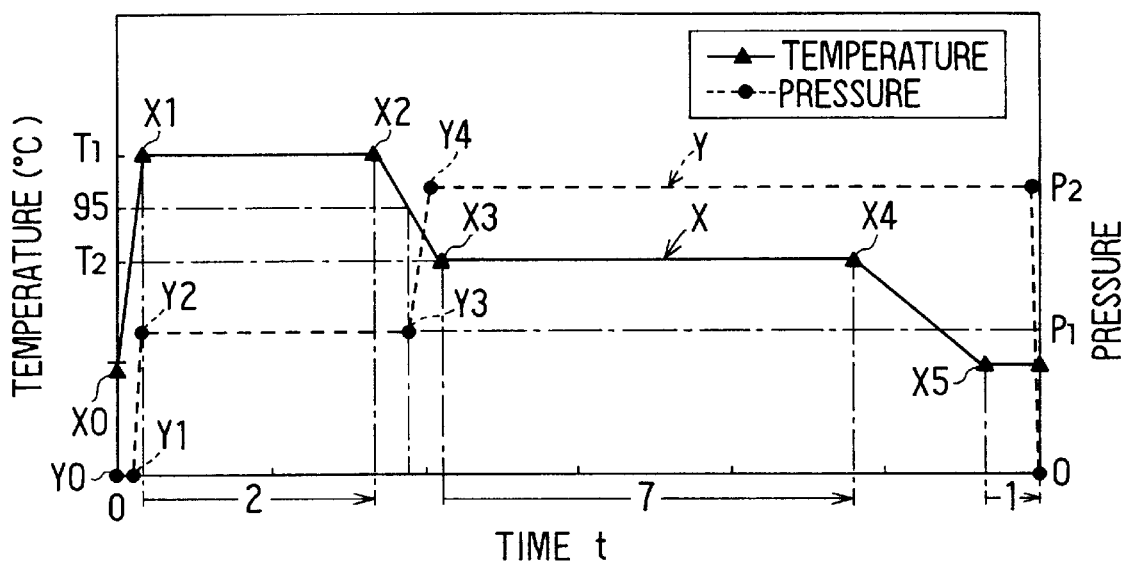
FIG. 4 is a graph showing profiles of temperature and pressure in pressurizing and heating step S8 shown in FIG. 3.
Figure 5:
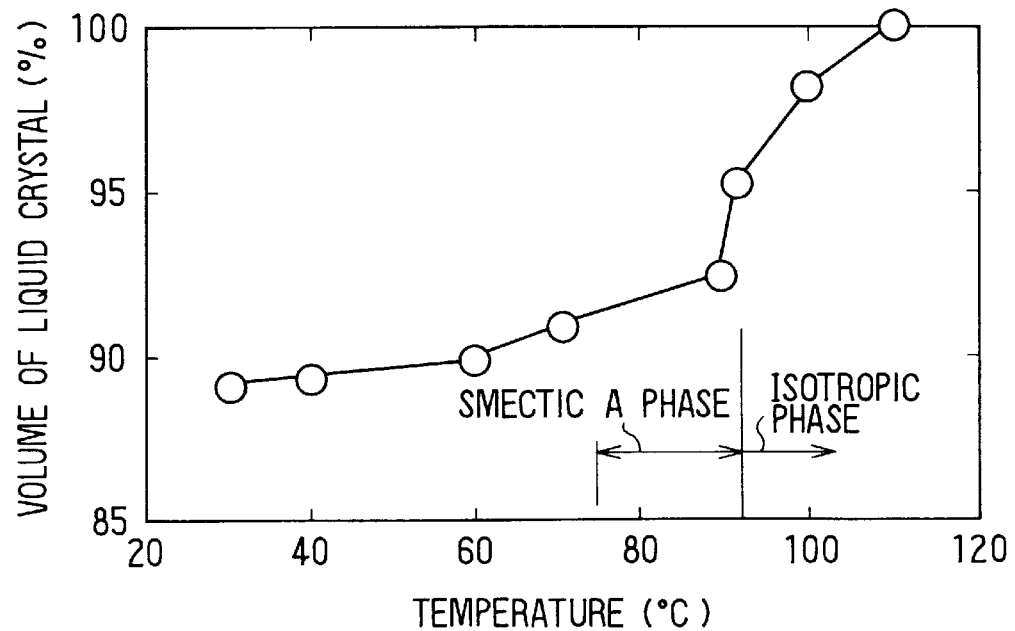
FIG. 5 is a graph showing a change in volume of smectic liquid crystal with respect to temperature.

In this case, subsequent pressurizing and heating processes (step S8) can be performed from point X2 on the profile X and the corresponding pressure on the profile Y shown in FIG. 4. The pressure at point Y4 is controlled to be higher by a specific amount than that between Y2 and Y3 on the profile Y. Thus, when steps S7, S8 are combined, the time for filling the liquid crystal cell with smectic liquid crystal 40 is shortened. In addition, the process corresponding to the profile X from X1 to X2 and the corresponding profile Y can be omitted, resulting in decrease in time for manufacturing the liquid crystal cell.

In this embodiment, step S8 is performed utilizing the phase transition of smectic liquid crystal 40 between the isotropic phase and the smectic A phase. Instead, phase transition between the isotropic phase and the chiral smectic C phase or between the isotropic phase and the chiral smectic CA phase can be utilized in step S8 as well. After filling the smectic liquid crystal with smectic liquid crystal in step S7, the liquid crystal cell may be pressurized at a softening temperature of smectic liquid crystal 40. In this case, thereafter, the temperature of the liquid crystal cell is lowered, while the pressure is increased. Accordingly, smectic liquid crystal 40 is sucked into the liquid crystal cell to compensate the volume reduced by the volumetric shrinkage of smectic liquid crystal 40 filling the cell.

In this embodiment, in step S8, while keeping the temperature at T1 between X1 and X2 on the profile X, the pressure is kept at P1 (3 kg/cm$^2$) so that the liquid crystal cell is preliminarily filled with smectic liquid crystal 40. However, it is not always necessary that the liquid crystal cell is preliminarily filled with smectic liquid crystal in step S8. When smectic liquid crystal 40 has the smectic phase after performing step S7, the pressure around the liquid crystal cell may be successively and directly increased to P2. Even if the preliminary filling of smectic liquid crystal 40 is not performed, in the successive process, the liquid crystal cell can be securely filled with smectic liquid crystal 40 to eliminate the vacancies therein. In this embodiment, although the pressurization from Y3 to Y4 is started when the temperature is decreased to 95° C., which is higher than T2, it may be started when the temperature is T2 or less. Accordingly, the same effects as mentioned above can be obtained.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A method of filling a liquid crystal cell with smectic liquid crystal, the method comprising the steps of:

supplying the smectic liquid crystal into the liquid crystal cell at a first temperature and under a first pressure; and supplying the smectic liquid crystal into the liquid crystal cell at a second temperature at which the smectic liquid crystal has a smectic phase and under a second pressure higher than the first pressure, the second temperature being lower than the first temperature.

2. The method of claim 1, wherein the smectic liquid crystal has an isotropic phase at the first temperature.

3. The method of claim 1, wherein the smectic liquid crystal is softened at the first temperature.

4. The method of claim 1, wherein the smectic liquid crystal is in a liquid state at the first temperature.

5. The method of claim 1, wherein the smectic phase is a smectic A phase.

6. The method of claim 1, wherein the first pressure is increased to be the second pressure at the second temperature.

7. The method of claim 1, wherein, in the step of supplying the smectic liquid temperature at the second temperature, the second temperature is constant for a specific time period.

8. The method of claim 1, wherein the step of supplying the smectic liquid crystal into the liquid crystal cell at the second temperature includes steps of:

maintaining the second temperature and the second pressure for a specific time period so that the smectic liquid crystal is supplied into the liquid crystal cell; and lowering a temperature from the second temperature to a third temperature while maintaining the second pressure.

9. The method of claim 1, wherein the second pressure is maintained for at least as long as the second temperature is maintained.

10. A method of filling a liquid crystal cell with smectic liquid crystal, the method comprising the steps of:

disposing the smectic liquid crystal in a vicinity of a liquid crystal suction port of the liquid crystal cell;

filling the liquid crystal cell with the smectic liquid crystal through the liquid crystal suction port at a first constant temperature and under a first pressure so that part of the smectic liquid crystal remains in the vicinity of the liquid crystal suction port; and supplying the smectic liquid crystal remaining in the vicinity of the liquid crystal suction port into the liquid crystal cell through the liquid crystal suction port at a second constant temperature lower than the first constant temperature and under a second pressure larger than the first pressure.

11. The method of claim 10, wherein the smectic liquid crystal has an isotropic phase at the first constant temperature, and has a smectic phase at the second constant temperature.

12. A method of filling a liquid crystal cell with smectic liquid crystal, the method comprising the steps of:

supplying the smectic liquid crystal into the liquid crystal cell at a first temperature and under a first pressure, the smectic liquid crystal having an isotropic phase at said first temperature; and supplying the smectic liquid crystal into the liquid crystal cell at a second temperature lower than the first temperature to produce a phase transition of the smectic liquid crystal from the isotropic phase to a smectic phase and increasing the pressure to a second pressure after the phase transition.

\* \* \* \* \*